United States Patent Office 3,469,968
Patented Sept. 30, 1969

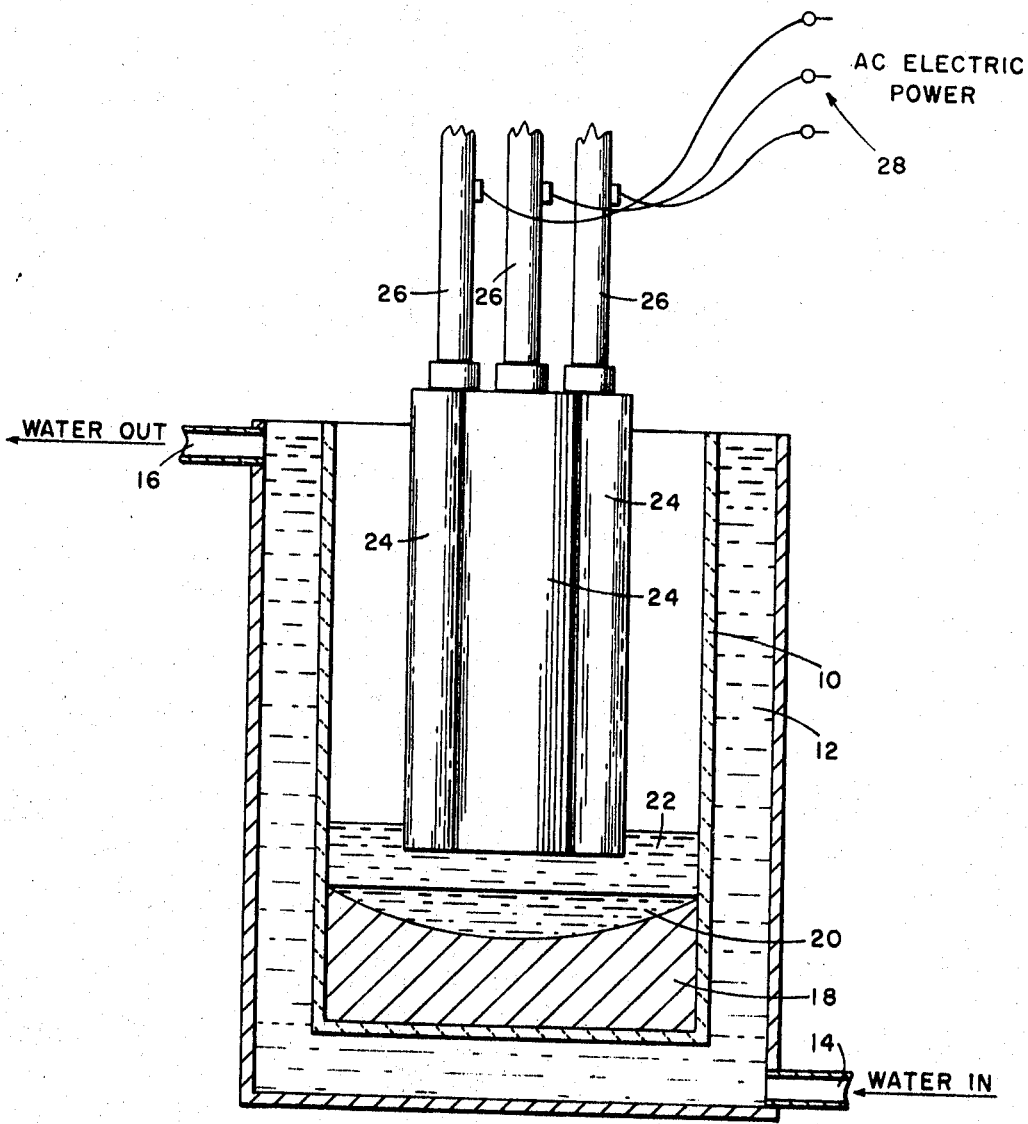

3,469,968
ELECTROSLAG MELTING
Karl S. Snow, Boulder City, Nev., assignor to Allegheny Ludlum Steel Corporation, Brackenridge, Pa., a corporation of Pennsylvania
Filed Oct. 20, 1965, Ser. No. 498,526
Int. Cl. C22d 7/00; B22d 27/02
U.S. Cl. 75—10
10 Claims

ABSTRACT OF THE DISCLOSURE

A process for melting consumable electrode of metal by electroslag resistance heating wherein a pool of molten metal is established in a mold and a consumable electrode positioned thereabove. A layer of molten slag is formed above the molten metal and the end of the consumable electrode is immersed in the slag whereby alternating current resistance heating of the slag layer causes melting of the consumable electrode and is continued until an ingot is formed.

---

This invention relates to consumable electrode melting of metals, and more particularly to consumable electrode melting of such metals under a protective slag cover.

Refractory metals are often melted as consumable electrodes in an arc furnace. The arc furnace during melting may be provided with an atmosphere of inert gas such as, for example, argon or helium, or the furnace interior may be maintained under vacuum. Such melting is advantageous to produce an ingot of very pure and homogenous metal, since no impurities are picked up by the metal during melting as might occur when such metals are melted while exposed to the atmosphere. In fact, under conditions in which the furnace is operated under vacuum, some volatile impurities may actually be extracted from the metal during the melting process, resulting in an appreciable reduction of impurity content.

Consumable electrode melting of metals as heretofore practiced has suffered, however, from some disadvantages. If operated under vacuum, furnaces must be especially constructed to be able to resist atmospheric pressure. If operated under inert gas, the furnace must be gas-tight, and provision for supply of such gas of suitable purity must be made, and the expense is not immaterial. Commercial consumable electrode melting furnaces, so far as is known, are universally operated employing direct current. It has always been thought desirable to use direct current since this provides favorable conditions for establishing and maintaining a melting arc. A stable arc can be obtained with direct current using an appropriate power level for efficient melting, and the consumable electrode may be connected as either the anode or the cathode. Suitable rectifiers must, however, be provided in order to convert generally available alternating current to desired direct current, most often at a voltage of from 20 to 100 volts.

Arc melting of a consumable electrode under a protective layer of molten slag has been proposed. Such a process provides protection for the metal being melted and may eliminate the need for an inert gas atmosphere or vacuum in a consumable electrode furnace. But employment of direct current to provide what have heretofore been considered best arc melting conditions has resulted in a serious lowering of melting efficiency when using a molten slag cover, compared to melting efficiencies obtained when operating a consumable electrode furnace in an insert gas atmosphere or vacuum. An arc furnace operating to melt a consumable electrode under a protective layer of molten slag has shown an output of only one-half to one-third of the melting rate (per unit of power consumed) of a similar type electrode being melted under inert gas or in vacuum. This lower melting rate involves a very disadvantageous higher cost for the melting operation.

Summarized briefly, this invention provides a process for melting a consumable electrode of a metal of a predetermined composition under a protective layer of slag, but at a melting rate or efficiency comparable to that obtained when melting such an electrode under an atmosphere of inert gas or vacuum. This is accomplished by first introducing a starter body of said metal into the bottom of said mold and then arranging a consumable electrode of the metal to be melted in spaced relation above the starter body. Melting power in the form of only alternating current is then caused to flow between the electrode and the starter body which very quickly forms a pool of molten metal within the mold. Slag forming ingredients are fed onto the molten pool at a predetermined rate and in an amount sufficient to eventually extinguish the arc which has been established between the electrode and the molten pool of metal within the mold. Power is continuously passed between the bottom of the consumable electrode and the pool of molten metal in the mold and at the same time the electrode is progressively lowered to maintain its bottom end immersed within the slag which has thereafter become molten due to its proximity to the electric arc established between the molten pool and the consumable electrode. The electrode is lowered at a rate substantially equal to the rate at which its length is being reduced by the melting action which transfers metal as molten droplets from the bottom of the consumable electrode into the molten pool in the mold. The alternating electric current is applied at a rate and at a voltage, and the electrode is lowered at a rate, to produce a melting efficiency of over two pounds of metal per kilowatt hour.

Advantageously, the process of this invention is operated employing a plurality of consumable electrodes in a single cold mold. Preferably, a trio of electrodes is used with each electrode connected to one phase of a three-phase alternating current power supply. The trio of electrodes is arranged in suitable support mechanism for raising and lowering the electrodes into and out of the mold, and the electrodes are spaced apart sufficiently one from the other to prevent short-circuiting between electrodes above the melting zone. When three electrodes are used in this manner and employing a prefused slag, the current flows from the bottom of each electrode to the bottom of another electrode when the slag is molten. This cycle is repeated with current flowing progressively from each electrode to a neighboring electrode, according to the three-phase alternating current cycle. Such operation employing a trio of electrodes connected to three-phase electric current has several advantages. First, it provides direct use of a generally available type of commercial current supply, which is most often three-phase alternating current. Second, it eliminates any electrical connections to the crucible itself to provide current flow through the molten pool as the lower electrode. Third, it completely eliminates any tendency of the arc to travel to the crucible wall with the danger of perforation, since the current flow is always between the electrodes themselves through the molten slag.

The process of this invention may be more readily understood by reference to the accompanying drawing, the single figure of which illustrates a trio of electrodes being melted under a cover of molten slag.

In the drawing is shown a crucible or mold 10 surrounded by a cooling jacket 12 through which water may be circulated, entering at inlet 14 and being withdrawn from outlet 16. In the crucible 10 is shown a partly solidified ingot 18 on top of which is a pool of molten metal 20. On top of the molten metal pool 20 is a layer of molten slag 22 in which are immersed the bottom ends of a trio of electrodes 24. These electrodes 24 are actuated up and down by suitable mechanical or electro-mechanical apparatus (not shown), each being connected thereto by a driving ram 26. Each of the electrodes 24, conveniently through its driving ram 26, is connected to one phase of a three phase alternating current power supply, as indicated generally at 28.

The starter body, placed first in the bottom of the mold before actual melting is initiated, should be of the same composition as the consumable electrode or electrodes which are to be melted. The starter body may take the form of a flat plate essentially covering the mold bottom, and on this may be placed discrete particles of similar metal, for example, pieces of scrap, turnings, or subdivided metal on which a starting arc may be readily struck. After placement of the starter body in the mold, it may then be partially covered with a prefused slag.

Preferably, the slag ingredients are prefused, cooled, and then subdivided so that the slag may be more readily introduced into the melting zone as needed. It has been found advantageous to first lower the consumable electrodes to strike an arc to partially melt the starter body and a portion of the metal of the electrode. When a pool of molten metal has been established, slag is fed into the melting zone on top of the pool of molten metal. The slag is melted by the heat of the arc and the molten metal to form the molten slag layer. The slag should be fed slowly so that sufficient heat is available from the arc at first, and later by resistance heating after the arc is extinguished, to retain a pool of molten metal as well as the gradually increasing depth of molten slag. When the desired depth of slag layer has been formed, and this may vary from about 3 inches to about 6 inches on top of the metal in the mold, the consumable electrode control may be adjusted for steady state melting through the slag, as hereinafter described in more detail.

The slag may comprise a combination of refractory oxides having a melting point suitably below the melting point of the metal being melted and also containing ingredients which will not tend to decompose rapidly when molten in the furnace. It is important also that the slag contain no constituents which will react with the metal being melted or with the material from which the cold mold is fabricated, generally copper. For melting corrosion resistant steels, it has been found that a slag consisting essentially of 40% $Al_2O_3$, 50% CaO, and 10% $CaF_2$ can be used; and for melting high speed steel, a slag consisting of 5% $Al_2O_3$, 10% MgO, 61% CaO, and 24% $SiO_2$ has been found to function very satisfactorily. Where superalloys and other metals containing titanium are employer as the consumable electrodes, it is desirable to modify the 40% $Al_2O_3$–50% CaO–10% $CaF_2$ slag by the addition of up to about 25% by weight of $TiO_2$ thereto. For melting reactive metals such as, for example, titanium or zirconium, the slag should be formulated without any oxidic compounds because oxygen is readily absorbed by these metals at elevated temperature. Combinations of halides, particularly fluorides, are most useful under these conditions; and for slag to be used for melting titanium, one consisting of high purity calcium fluoride would be advantageous.

After the molten slag cover has been formed, melting is continued using only alternating current flowing between the electrodes and the pool of molten metal in the mold; or between electrodes through the slag if multiple electrodes are employed. It is most important to maintain the bottom of the electrode or electrodes immersed in the molten slag so that no arcing takes place. It is a significant and important aspect of this invention that melting is accomplished not by heat from an arc discharge but by heat from the molten slag, which is maintained at elevated temperature by passage therethrough of alternating electric current from electrode to pool of molten metal, or between electrodes. Essentially, melting is by resistance heating, the resistance of the slag itself providing the means for raising the temperature of the immersed bottom of the electrode or electrodes so that molten drops of metal are formed which are transferred to the pool of molten metal in the mold. As will be discussed hereinafter, the efficiency of the resistance heating arrangement according to this invention is substantially greater than the efficiency of arc melting under molten slag, such as occurs when direct electric current is employed for melting power.

Under the conditions of melting operation, it is necessary to lower the electrode or electrodes progressively as metal is melted off their bottoms and transferred through the molten slag to the pool of molten metal in the crucible. Lowering of the electrode or electrodes may be controled automatically by apparatus now commonly used for control of movement of similar electrodes in consumable electrode arc furnaces designed for operation in vacuum or under inert gas. Such controls operate by reference to the voltage and/or amperage of the alternating electric current flowing between the end of the electrode and the molten metal pool, or, in multiple electrode furnaces, between the electrodes and the molten metal pool (phase to neutral voltage). Suitable electrical circuits based on comparison of actual voltages and amperages in the furnace circuits compared to stable references are employed to actuate relays and motor drives to raise or lower the electrode or electrodes to maintain the desired electrical conditions and spacing between the electrode bottom or bottoms and the molten metal pool. In the case of melting operations according to this invention, such control systems will be established to maintain the bottom of the electrode or electrodes always submerged below the surface of the slag layer. It will be appreciated that with greater power input and faster melting rate, the electrodes must be lowered at a correspondingly greater rate to maintain their bottom ends properly submerged in the molten slag. The electrode drive control must therefore be adjusted to obtain proper electrode movement, and this will be related to the power supplied to the electrodes.

After melting has progressed to the point that the consumable electrode or electrodes has or have been essentially consumed to the limit of their practical length, then melting power is shut off, the ingot in the mold is allowed to cool and may, in due time, be removed therefrom. The so-formed ingot will be found to have an acceptable outer surface requiring little in the way of conditioning or removal of surface imperfections before processing into desired forms or mill products. In addition, the ingot will be found to be homogenous and of uniform structure and composition.

The efficiency of the melting process according to this invention is apparently due to the unique melting action which results from resistance heating by passage of alternating electric current through the slag, and which does not depend on melting by means of an electric arc. When using direct electric current and with formation of a submerged arc, melting appears to be relatively inefficient because of polarization. The resulting anode effect seriously hampers current flow between a consumable electrode and the pool of molten metal so that the resulting melting efficiency, considered as pounds of metal melted per unit of electric power consumed, is only from one-half to one-third the efficiency obtained by melting a corresponding type electrode in a similar arc furnace using an inert gas or vacuum in place of the slag cover. In the case of the instant invention, however, when only alternating current is employed for melting power and the effective mechanism appears to be resistance heating, the melting efficiency in pounds of metal per unit of electric power consumed is essentially of the same order of magnitude as obtained in an arc furnace operated with inert gas or vacuum atmosphere and without using any slag cover. Therefore, practice of the process of this invention provides the advantage of slag cover consumable electrode melting without the disadvantageous low melting efficiency heretofore associated with this general type of process.

The following example will illustrate a selected embodiment of the practice of this invention:

EXAMPLE 1

In this example, 9½ inch diameter mild steel round electrodes were melted into an ingot. A trio of such electrodes 8 feet long were used in a furnace arranged with individual electrode drive rams to which each of the electrodes was attached by the stub at its top. The ram drives were controlled by an electrical system based on maintaining a constant or predetermined voltage between the electrodes and a pool of molten metal in the furnace mold. The furnace mold itself was of copper, water-cooled, and 28 inches interior diameter.

A striker plate ¾-inch thick, constituting a starter body of the same type of steel as the electrodes, was placed in the bottom of the mold. The furnace interior was then evacuated, and an atmosphere of helium was introduced therein. The electrodes were then lowered, until an arc was struck between the electrodes and the striker plate to produce partial melting of the striker plate metal and the electrode metal. When some metal was being melted and heat produced, subdivided slag was slowly introduced. The slag consisted of about 50% CaO, 40% $Al_2O_3$, and 10% $CaF_2$. The slag composition had previously been fused and then cooled and ground to provide material suitable for introduction into the furnace.

Slag was introduced into the furnace over a period of about 35 minutes, and during this period about 200 pounds of slag was introduced which formed a molten layer about 5 inches deep over the level of the metal in the mold. When slag was initially added, heating and melting was by arc discharge; but when an appreciable layer of molten slag had been obtained, the arc was extinguished and melting was continued by heat produced by passage of alternating electric current through the slag as resistance. This transition occurred about 20 minutes after slag introduction had been started.

With all the desired slag introduced and steady state resistance heating-melting established, the automatic ram drive control was set to maintain a phase to neutral voltage of 45 volts. This setting resulted in a gradual lowering of the electrode as it was progressively melted and transferred to the pool of molten metal in the mold. The control setting maintained the bottoms of the electrodes immersed in the molten slag and also maintained them more or less uniformly spaced from the pool of molten metal. Lowering of the electrodes under these conditions was at a rate substantially equal to the rate at which their lengths were being reduced by the melting action in the molten slag. Alternating current input was about 9,000 amperes to each electrode, producing a melting rate of about 43 pounds per minute for the three electrodes. A slow helium purge of 60 cubic feet per hour was maintained over the melting zone in the furnace.

After the electrodes had been melted to a predetermined end point, power to the electrodes was shut off and the ingot in the mold was allowed to cool, while maintaining the helium purge, for an hour before the furnace was opened and the ingot removed.

The so-produced ingot was found to have a good, clean surface and to be of satisfactory quality.

Melting efficiency was calculated to be about 2.2 pounds per kilowatt hour, based on alternating electric current used during the stable melting period.

The melting process of this invention provides an efficient method of melting consumable electrodes of refractory metal under a slag cover. It eliminates the need for operation under vacuum or inert gas when melting metals which are not particularly reactive, for example steel, since the slag cover protects the melt from the atmosphere. For reactive metals, for example titanium and zirconium, some additional protection in the form of inert gas purge or atmosphere will provide best operating conditions. If desired, a purge of inert gas may be maintained through the melting zone to help carry away smoke, dust, and volatile materials generated at the melting temperature.

The melting efficiency of the process of this invention will be advantageously high, generally over 2 pounds of metal per kilowatt hour of power input. This is of the same order of magnitude as that obtained when arc melting in vacuum or inert gas and two or three times the efficiency obtained when arc melting under slag cover using direct current.

I claim:

1. A process for melting a consumable electrode of metal by electroslag resistance heating to produce a high quality homogeneous ingot in a cold mold which comprises:
   (a) establishing a pool of molten metal in a mold in spaced relation beneath a consumable electrode connected to only a source of alternating electrical current;
   (b) continuing the melting of the consumable electrode while feeding slag forming ingredients into the space between the molten pool and the electrode to form a molten slag to cover the molten metal to a sufficient depth to immerse an end of the consumable electrode therein; and
   (c) lowering said electrode to maintain its lower end immersed in said molten slag while continuing to pass only alternating electric current between the bottom of said electrode and said pool of molten metal, said electrode being lowered at a rate substantially equal to the rate at which its length is being reduced by the melting action in said molten slag due solely to resistance heating by the passage of alternating current through the slag;
   (d) continuing melting of said electrode to form a substantially homogeneous ingot in said mold.

2. A process for melting a consumable electrode of metal by electroslag resistance heating to produce a high quality homogeneous ingot in a mold which comprises:
   (a) introducing a starter body of said metal into the bottom of said mold;
   (b) establishing a pool of molten metal on the starter body in said mold in spaced relation beneath a consumable electrode connected to only a source of alternating electrical current;
   (c) continuing the melting of the consumable electrode into the molten metal while feeding slag forming ingredients into the space between the molten pool and the electrode to form a molten slag to cover the molten metal to a sufficient depth to immerse an end of the consumable electrode therein;
   (d) lowering said electrode to maintain its lower end and immersed in said molten slag while continuing to pass only alternating electric current between the bottom of said electrode and said pool of molten metal, said electrode being lowered at a rate substantially equal to the rate at which its length is being reduced by the melting action in said molten slag due solely to resistance heating by the passage of alternating current through the slag; and
   (e) continuing melting of said electrode to form a substantially homogeneous ingot in said mold.

3. A process for melting a consumable electrode of metal by electroslag resistance heating to produce a high quality homogeneous ingot in a mold which comprises:
   (a) introducing a starter body of said metal into the bottom of said mold;
   (b) partially covering said starter body with slag forming ingredients;
   (c) establishing a pool of molten metal in said mold in spaced relation beneath a consumable electrode connected to only a source of alternating electrical current;

(d) continuing the melting of the consumable electrode into the molten metal while feeding additional slag forming ingredients into the space between the molten pool and the electrode to form a molten slag to cover the molten metal to a sufficient depth to immerse an end of the consumable electrode therein;

(e) lowering said electrode to maintain its lower end immersed in said molten slag while continuing to pass only alternating electric current between the bottom of said electrode and said pool of molten metal, said electrode being lowered at a rate substantially equal to the rate at which its length is being reduced by the melting action in said molten slag due solely to resistance heating by the passage of alternating current through the slag; and (f) continuing melting of said electrode to form a substantially homogeneous ingot in said mold.

4. A process for melting a consumable electrode of metal by electroslag resistance heating to produce a high quality homogeneous ingot in a mold which comprises:

(a) introducing a starter body of said metal into the bottom of said mold;

(b) maintaining the lower end of a consumable electrode of said metal immersed in said slag but maintaining said end spaced apart from said starter body;

(c) passing only alternating electric current between the immersed end of said electrode and said starter body, thereby to heat said slag by resistance heating and to progressively melt said electrode to form a pool of molten metal and an ingot in said mold;

(d) lowering said electrode to main its lower end immersed in said molten slag while continuing to pass only alternating electric current between the bottom of said electrode and said pool of molten metal, said electrode being lowered at a rate substantially equal to the rate at which its length is being reduced by the melting action in said molten slag due solely to resistance heating by the passage of alternating current through the slag; and (e) continuing melting of said electrode to form a substantially homogeneous ingot in said mold.

5. A process for melting a consumable electrode of metal by electroslag resistance heating to produce a high quality homogeneous ingot in a mold which comprises:

(a) introducing a starting body of said metal into the bottom of said mold;

(b) covering said starter body of metal with a layer of slag;

(c) maintaining the lower end of a consumable electrode of said metal immersed in said slag but maintaining said end spaced apart from said starter body;

(d) passing only alternating electric current between the immersed end of said electrode and said starter body, thereby to heat said slag by resistance heating and to progressively melt said electrode to form a pool of molten metal and an ingot in said mold;

(e) lowering said electrode to maintain its lower end immersed in said molten slag while continuing to pass only alternating electric current between the bottom of said electrode and said pool of molten metal to melt said electrode by resistance heating resulting from the passage of only said alternating current through said slag, said electric current being passed at a rate and at a voltage, and said electrode being lowered at a rate to produce a melting efficiency of over two pounds of metal per kilowatt hour; and (f) continuing melting of said electrode to form a substantially homogeneous ingot in said mold.

6. A process for melting consumable electrodes of metal by electroslag resistance heating to produce a high quality homogeneous ingot in a mold which comprises:

(a) introducing a starter body of said metal into the bottom of said mold;

(b) partially covering said starter body of metal with a layer of slag;

(c) maintaining the lower ends of a plurality of spaced apart consumable electrodes of said metal in said slag but maintaining said ends spaced apart from said starter body;

(d) passing only alternating electric current between the immersed ends of said electrodes thereby to heat said slag by resistance heating and to progressivley melt said electrodes to form a pool of molten metal and an ingot in said mold;

(e) lowering said electrodes to maintain their lower ends immersed in said molten slag while continuing to pass only alternating electric current between the bottoms of said electrodes, said electrodes being lowered at a rate substantially equal to the rate at which their lengths are being reduced by the melting action in said molten slag due solely to resistance heating by the passage of alternating current through the slag; and (f) continuing melting of said electrodes to form a substantially homogeneous ingot in said mold.

7. A process for melting consumable electrodes of metal by electroslag resistance heating to produce a high quality homogeneous ingot in a mold which comprises:

(a) introducing a starter body of said metal into the bottom of said mold;

(b) positioning the lower ends of a plurality of spaced apart consumable electrodes of said metal in spaced relation to said starter body;

(c) passing only alternating electric current between the end of said electrodes to form a pool of molten metal and an ingot in said mold;

(d) introducing slag forming ingredients into the space between the electrodes and the molten metal pool;

(e) lowering said electrodes to maintain their lower ends immersed in said molten slag while continuing to pass only alternating electric current between the bottoms of said electrodes to melt said electrodes by resistance heating resulting from the passage of only said alternating current through said slag, said electric current being passed at a rate and at a voltage, and said electrode being lowered at a rate to produce a melting efficiency of over two pounds of metal per kilowatt hour; and (f) continuing melting of said electrodes to form a substantially homogeneous ingot in said mold.

8. A process for melting consumable electrodes of metal by electroslag resistance heating to produce a high quality homogeneous ingot in a mold which comprises:

(a) introducing a starter body of said metal into the bottom of said mold;

(b) lowering a plurality of spaced apart consumable electrodes to within arc striking distance of said starter body;

(c) passing only alternating electric current between said electrodes and said starter body to strike and maintain an arc therebetween, said arc heating and melting the ends of said electrodes to form a pool of molten metal in said mold, meanwhile adding subdivided slag to said mold to be heated and melted by said arc and said molten metal thereby to cover said starter body with a layer of molten slag;

(d) passing only alternating electric current between the immersed end of said electrodes, thereby to heat said slag by resistance heating and to progressively melt said electrodes to form a pool of molten metal and an ingot in said mold;

(e) lowering said electrodes to maintain their lower ends immersed in said molten slag while continuing to pass only alternating electric current between the bottoms of said electrodes to melt said electrodes by resistance heating resulting solely from the passage of said alternating current through said slag, said electric current being passed at a rate and at a voltage, and said electrode being lowered at a rate to produce a melting efficiency of over two pounds of metal per kilowatt hour; and (f) continuing melting of said electrodes to form a substantially homogeneous ingot in said mold.

9. A process for melting consumable electrodes of metal by electroslag resistance heating to produce a high quality homogeneous ingot in a mold which comprises:

(a) introducing a starter body of said metal into the bottom of said mold;

(b) covering said started body of metal with a layer of molten slag consisting essentially of about up to 50% $Al_2O_3$, 60% CaO, and 20% $CaF_2$;

(c) maintaining the lower ends of a plurality of spaced apart consumable electrodes of said metal immersed in said molten slag but maintaining said ends spaced apart from said starter body;

(d) passing only alternating electric current between the immersed end of said electrodes, thereby to heat said slag by resistance heating and to progressively melt said electrodes to form a pool of molten metal and an ingot in said mold;

(e) lowering said electrodes to maintain their lower ends immersed in said molten slag while continuing to pass only alternating electric current between the bottoms of said electrodes to melt said electrodes by resistance heating resulting from the passage of only said alternating current through said slag, said electric current being passed at a rate and at a voltage, and said electrode being lowered at a rate to produce a melting efficiency of over two pounds of metal per kilowatt hour; and (f) continuing melting of said electrodes to form a substantially homogeneous ingot in said mold.

10. A process for melting consumable electrodes of metal by electroslag resistance heating to produce a high quality homogeneous ingot in a mold which comprises:

(a) introducing a starter body of said metal into the bottom of said mold;

(b) covering said starter body of metal with a layer of molten slag consisting essentially of about up to 50% $Al_2O_3$, 60% CaO, 20% $CaF_2$, and up to 25% $TiO_2$;

(c) maintaining the lower ends of a plurality of spaced apart consumable electrodes of said metal immersed in said molten slag but maintaining said ends spaced apart from said starter body;

(d) passing only alternating electric current between the immersed end of said electrodes, thereby to heat said slag by resistance heating and to progressively melt said electrodes to form a pool of molten metal and an ingot in said mold;

(e) lowering said electrodes to maintain their lower ends immersed in said molten slag while continuing to pass only alternating electric current between the bottoms of said electrodes to melt said electrodes by resistance heating resulting from the passage of only said alternating current through said slag, said electric current being passed at a rate and at a voltage, and said electrode being lowered at a rate to produce a melting efficiency of over two pounds of metal per kilowatt hour; and (f) continuing melting of said electrodes to form a substantially homogeneous ingot in said mold.

References Cited

UNITED STATES PATENTS

| | | | |
|---|---|---|---|
| 3,234,608 | 2/1966 | Péras | 75—10 X |
| 3,291,955 | 12/1966 | Shrubsall, et al. | 219—73 |
| 2,262,887 | 11/1941 | Deppeler | 75—13 |
| 2,694,023 | 11/1954 | Hopkins | 75—55 XR |
| 3,067,473 | 12/1962 | Hopkins | 75—10 XR |

OTHER REFERENCES

B. E. Paton, Electroslag Welding N.Y., American Welding Society, Inc. 1962. Chapter 7, p. 250–251; Chapter 1, p. 2.

L. DEWAYNE RUTLEDGE, Primary Examiner

J. E. LEGRU, Assistant Examiner

U.S. Cl. X.R.

13—9; 164—50